(12) United States Patent
Seetharamaiah et al.

(10) Patent No.: US 10,860,718 B2
(45) Date of Patent: Dec. 8, 2020

(54) PROTECTING COMPUTER SYSTEMS USED IN VIRTUALIZATION ENVIRONMENTS AGAINST FILELESS MALWARE

(71) Applicant: McAfee, LLC, San Jose, CA (US)

(72) Inventors: Sriranga Seetharamaiah, Karnataka (IN); Carl D. Woodward, Campbell, CA (US)

(73) Assignee: McAfee, LLC, San Jose, CA (US)

( * ) Notice: Subject to any disclaimer, the term of this patent is extended or adjusted under 35 U.S.C. 154(b) by 0 days.

(21) Appl. No.: 15/708,328

(22) Filed: Sep. 19, 2017

(65) Prior Publication Data
US 2019/0034633 A1 Jan. 31, 2019

(30) Foreign Application Priority Data
Jul. 28, 2017 (IN) .............................. 201741026875

(51) Int. Cl.
*G06F 12/14* (2006.01)
*G06F 21/56* (2013.01)
(Continued)

(52) U.S. Cl.
CPC ........ *G06F 21/566* (2013.01); *G06F 9/45558* (2013.01); *G06F 21/53* (2013.01);
(Continued)

(58) Field of Classification Search
CPC .... G06F 9/45558; G06F 21/53; G06F 21/604; G06F 9/45554; G06F 2009/45579;
(Continued)

(56) References Cited

U.S. PATENT DOCUMENTS

2005/0185789 A1* 8/2005 Goodwin ................ G06F 21/80
380/1
2008/0104591 A1* 5/2008 McCrory ............ G06F 9/45558
718/1
(Continued)

OTHER PUBLICATIONS

Kocoloski et al, XEMEM: Efficient Shared Memory for Composed Applications on Multi-OS/R Exascale Systems, Jun. 20, 2015, ACM, pp. 1-12.*

*Primary Examiner* — Alexander Lagor
*Assistant Examiner* — Jenise E Jackson
(74) *Attorney, Agent, or Firm* — Hanley, Flight & Zimmerman, LLC

(57) ABSTRACT

Techniques for protecting a computer system against fileless malware are described. One technique includes a virtual machine (VM) locker logic/module implemented by one or more processors receiving information about input/output (I/O) requests associated with injection of data into a process. The logic/module can generate or update an information log to reflect that the process includes data from an external source. The data from the external source can include fileless malware. The technique also includes the logic/module intercepting an execution request by a process (e.g., the process that includes data from an external source, another process, etc.), where an execute privilege located in an operating system mediated access control mechanism approves the request. Next, the logic/module determines that the process requesting execution is included in the log and removes an execute privilege located in a hypervisor mediated access control mechanism to deny the request. Other advantages and embodiments are described.

13 Claims, 8 Drawing Sheets

(51) Int. Cl.
G06F 21/60 (2013.01)
G06F 21/53 (2013.01)
G06F 9/455 (2018.01)

(52) U.S. Cl.
CPC ........ *G06F 21/604* (2013.01); *G06F 9/45554* (2013.01); *G06F 2009/45579* (2013.01); *G06F 2009/45587* (2013.01); *G06F 2221/033* (2013.01); *G06F 2221/034* (2013.01); *G06F 2221/2141* (2013.01)

(58) Field of Classification Search
CPC ..... G06F 2009/45587; G06F 2221/033; G06F 2221/2141; G06F 9/45512; G06F 9/45533; G06F 9/45545
USPC .......................................................... 726/23
See application file for complete search history.

(56) References Cited

U.S. PATENT DOCUMENTS

| | | | | |
|---|---|---|---|---|
| 2013/0132690 A1* | 5/2013 | Epstein | ............... | G06F 12/1416 711/159 |
| 2015/0215335 A1* | 7/2015 | Giuliani | .............. | H04L 63/1441 726/23 |
| 2015/0332047 A1* | 11/2015 | Rothwell | ............. | G06F 21/566 726/23 |
| 2016/0021142 A1* | 1/2016 | Gafni | ................. | H04L 63/1425 726/23 |

* cited by examiner

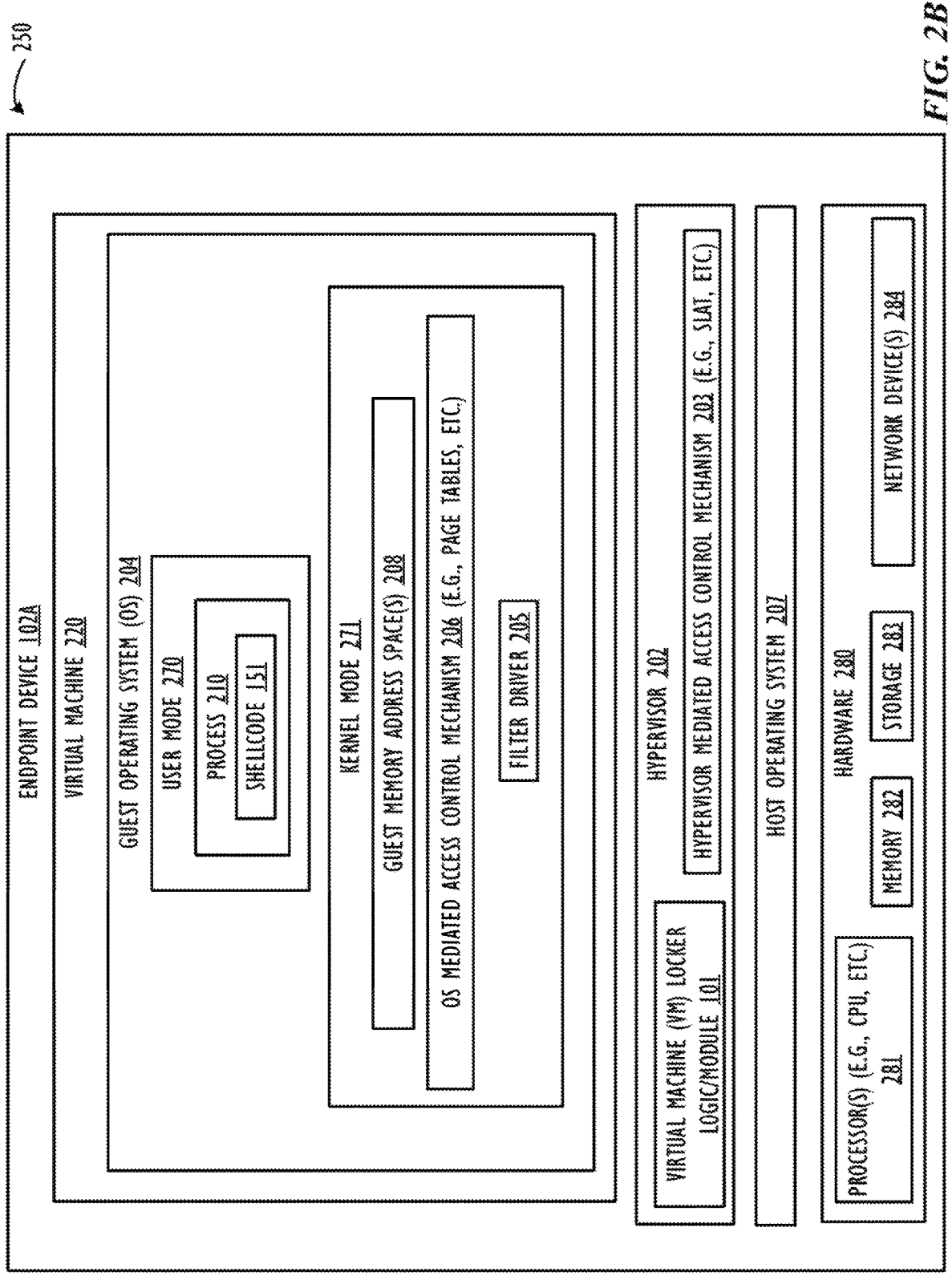

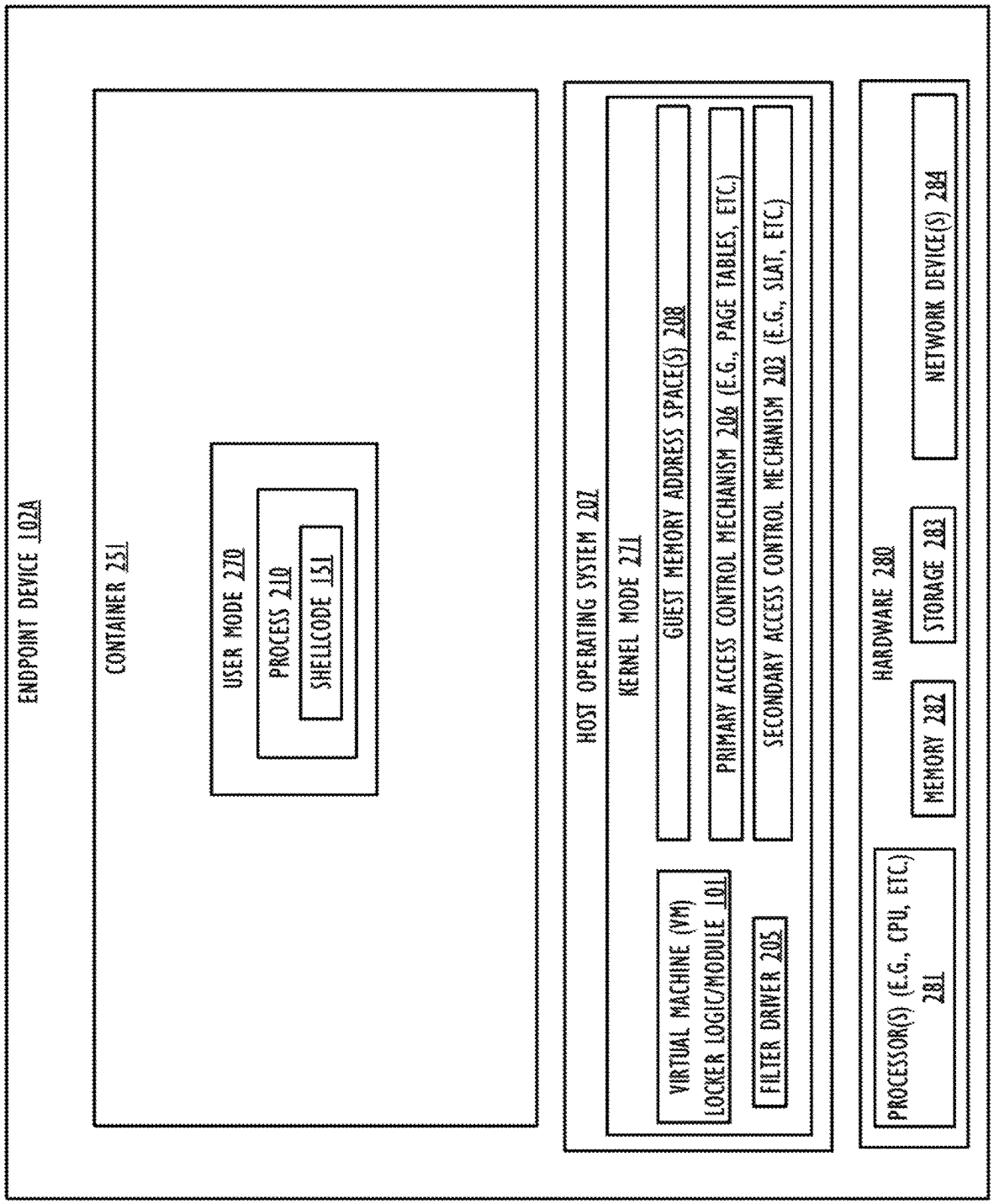

PROTECTING COMPUTER SYSTEMS USED IN VIRTUALIZATION ENVIRONMENTS AGAINST FILELESS MALWARE

TECHNICAL FIELD

Embodiments described herein generally relate to the field of security against malicious software (hereinafter "malware"). More particularly, embodiments described herein relate to techniques of protecting computer systems used in virtualization environments against fileless malware.

BACKGROUND ART

It is commonly known that there is a need to protect computers against malware, short for malicious software, which can cause a computer system to operate in an unintended manner. Malware generally encompasses multiple types of hostile or intrusive software—e.g., computer viruses, worms, Trojan horses, ransomware, spyware, adware, scareware, and other malicious programs. As software, malware can be in the form of executable code, scripts, active content, etc.

A specific type of malware known as "fileless malware" is gaining prevalence. This type of malware begins with injection of a malicious script or executable into a target process of a computer system and execution of the malicious script or executable by the computer system that can, in some scenarios, result in storage of artifacts in system's memory or registry. Fileless malware usually employs use of a shellcode that injects itself into the target process. A shellcode is a small piece of code that acts as the payload in exploitation of a software vulnerability. The shellcode can, in some scenarios, include an assembly language program that executes a shell on an operating system (OS) of a computer system and may be used as an exploit payload for providing an attacker with access to the computer system. When the shellcode is executed, it can start a command shell from which an attacker can use to control the computer system or even download additional unwanted payload onto the computer system. Different types of shellcode include, but are not limited to, local shellcode, remote shellcode, download-and-execute shellcode, staged shellcode, egg-hunt shellcode, and omelet shellcode. Protecting computer systems (e.g., host machines, virtual machines (VMs), etc.) against fileless malware is desirable.

BRIEF DESCRIPTION OF DRAWINGS

FIGS. 2A-2C are schematic diagrams of embodiments of a virtualization architecture configured to prevent execution of shellcode that has been injected into a computer system according to embodiments.

DESCRIPTION OF EMBODIMENTS

Figure 1:
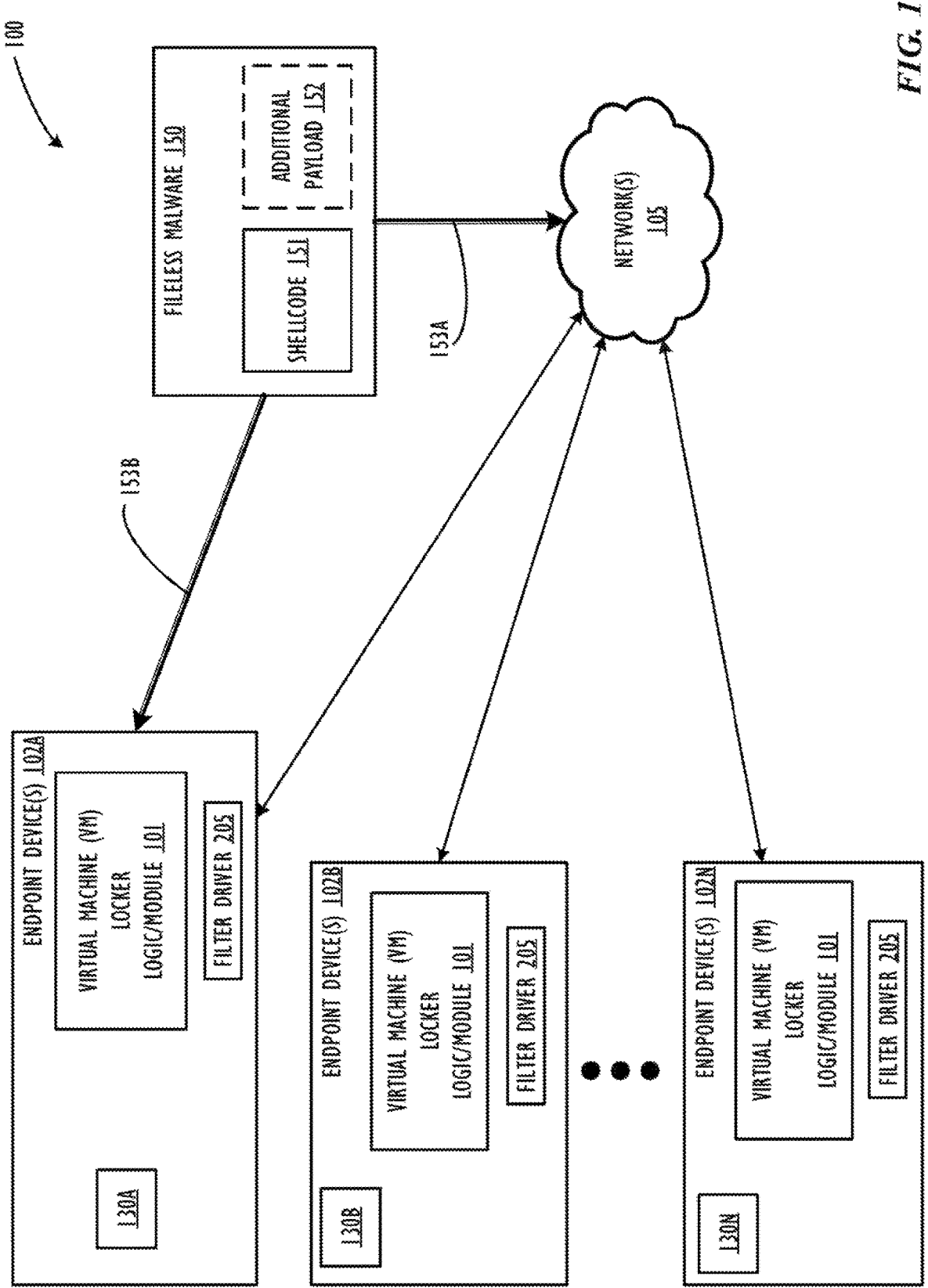
FIG. 1 is a schematic diagram of an embodiment of a network infrastructure where embodiments of the present disclosure may operate.

Embodiments described herein relate to virtualization based security techniques for protecting computer systems used in virtualization environments against fileless malware. The embodiments described herein have numerous advantages, which are directed to improving computer functionality. One or more of these advantages are achieved by using a hypervisor mediated memory access control mechanism to prevent execution of fileless malware instead of or together with using an OS mediated access control mechanism.

In the following description, for purposes of explanation, numerous specific details are set forth in order to provide a thorough understanding of the embodiments described herein. It will be apparent, however, to one skilled in the art that the embodiments described herein may be practiced without these specific details. In other instances, structures and devices are shown in block diagram form in order to avoid obscuring the embodiments described herein. References to numbers without subscripts or suffixes are understood to reference all instances of subscripts and suffixes corresponding to the referenced number. Moreover, the language used in this disclosure has been principally selected for readability and instructional purposes, and may not have been selected to delineate or circumscribe the inventive subject matter in the embodiments described herein. As such, resort to the claims is necessary to determine the inventive subject matter in the embodiments described herein. Reference in the specification to "one embodiment," "an embodiment," "another embodiment," or their variations means that a particular feature, structure, or characteristic described in connection with the embodiments is included in at least one of the embodiment described herein, and multiple references to "one embodiment," "an embodiment," "another embodiment," or their variations should not be understood as necessarily all referring to the same embodiment.

As used herein, a "computer system," a "computing device," and their variations refer to one or more physical or virtual programmable devices.

As used herein, a "physical programmable device" and its variations refer to a physical object that includes electronic components (commonly referred to as hardware) configured to receive, transmit, and/or process data information. For one embodiment, one or more of the electronic components may be embedded within the physical object, such as in wearable devices and mobile devices (e.g., self-driving vehicles). For one embodiment, the device may also include actuators, motors, control functions, sensors, and/or other components to perform one or more tasks without human intervention, such as drones, self-driving vehicles, and/or automated transporters. The programmable device can refer to a computing device, such as (but not limited to) a mobile computing device, a lap top computer, a wearable computing device, a network device, an internet of things (IoT) device, a cloud computing device, a vehicle, a smart lock, etc.

As used herein, a "virtual machine (VM)," a "virtual programmable device," "a logical computing device," and their variations refer to an emulation of a computer system comprised of one or more physical programmable devices. Generally, a VM lacks its own resources (e.g., physical processors, memory, etc.). Instead, a VM uses resources found in a host machine, e.g., a physical server computer. As such, a VM can conceptually be viewed as a guest machine that runs its own operating system(s) and software application(s) using a host machine's resources. A host machine can create and run one or more VMs using a hypervisor. The hypervisor is software, firmware, hardware, or any combination thereof that runs on the host machine's resources. Another name for a hypervisor is a virtual machine monitor (VMM). The hypervisor typically allocates some of the host machine's resources to each of the VMs. In this way, the VMs can access the host machine's resources for VM operations. One or more programmable devices can access one or more of the VMs to perform computing tasks. Virtualization technology that can be used together with or in lieu of VMs includes container-based virtualization, which can sometimes be referred to as OS-level virtualization. As used herein, "container-based virtualization," "OS-level virtualization," and their variations refer to a virtualization technique that is based on an OS without requiring use of an entire VM and/or hypervisor. In container-based virtualization, an OS implemented by the host machine's hardware is used for deploying and running distributed applications without launching an entire VM for each application. Instead, one or more isolated systems, called containers, are run on the OS and controlled by the OS's kernel. In this way, container-based virtualization allows the resources of a host computer to be partitioned via the OS's kernel for one or more containers. Containers may appear as computer systems to end users. In some scenarios, containers can be combined with VMs. One example of such a combination is known as hyper-V container. In this document, and for brevity, a VM may refer to a VM (as described above), a container (as described above) and/or a combination of a VM and a container (e.g., a hyper-V container, etc.).

As used herein, a "host machine" refers to a computer system comprised of one or more physical programmable devices. A VM is emulated using the host machine's hardware.

As used herein, a "program," a "computer program," and their variations refer to one or more computer instructions executed by one or more programmable devices to perform a task. Examples include, but are not limited to, software and firmware.

As used herein, a "computer network," a "network," and their variations refer to a plurality of interconnected programmable devices that can exchange data with each other. For example, a computer network can enable a computer system comprised of interconnected programmable devices to communicate with each other. Examples of computer networks include, but are not limited to, a peer-to-peer network, any type of data network such as a local area network (LAN), a wide area network (WAN) such as the Internet, a fiber network, a storage network, or a combination thereof, wired or wireless. In a computer network, interconnected programmable devices exchange data with each other using a communication mechanism, which refers to one or more facilities that allow communication between devices in the network. The connections between interconnected programmable devices are established using either wired or wireless communication links. The communication mechanisms also include networking hardware (e.g., switches, gateways, routers, network bridges, modems, wireless access points, networking cables, line drivers, switches, hubs, repeaters, etc.).

FIG. 1 is a block diagram illustrating an infrastructure 100 comprised of interconnected programmable endpoint devices 102A-N according to one embodiment. As shown, the infrastructure 100 includes multiple endpoint devices 102A-N, one or more networks 105, and fileless malware 150. For brevity, the descriptions provided herein in connection with FIG. 1 will sometimes focus on endpoint device 102A. These descriptions also apply to one or more of endpoint devices 102B-N.

Each of the endpoint devices 102A-N can include at least one internet of things (IoT) device, at least one mobile computing device, at least one cloud computing device, at least one logical or virtual computing device. Also, each of the endpoint devices 102A-N can include hardware 130A-N (i.e., physical electronic components 130A-N). Examples of the components 130A-N include: physical processing unit(s) (such as microprocessors, co-processors, central processing units (CPUs), other types of integrated circuits (ICs), etc.); corresponding physical memory; and/or other related circuitry. For one embodiment, each of the endpoint devices 102A-N includes a corresponding one of the virtual machine (VM) locker logic/modules 101 and a filter driver 205.

As shown, each of the endpoint devices 102A-N is a computer system that may comprise physical or virtual programmable devices. Computer systems typically use hardware comprised of a physical memory (e.g., a semiconductor chip) to hold data manipulated by physical processing unit(s) during computation. Such data includes, for instance, representations of processor instructions, inputs, and outputs of computation. Physical memory is accessed using an addressing system, wherein each addressable memory location has a unique physical address.

Modern software (e.g., an application, a VM, an OS, etc.) typically operates with an abstraction of physical memory, known as virtual memory. A virtual memory space is typically allocated to each piece of software (e.g., an application, a VM, an OS, etc.) that is on the hardware of a physical computer system. Virtual memory is addressable via a set of virtual addresses, also known as logical addresses. At any given time, each such virtual address is mapped, for instance by an OS of a physical computer system, to a physical address within the physical memory of the physical computer system. Stated differently, each virtual memory space is restricted to one or more specific regions of the physical memory (i.e., the hardware of a physical computer system). The mapping is generally not static, but may vary over time, so that virtual memory blocks might end up in different physical locations every time the virtual memory blocks are brought in from a backing store. The same physical memory can be allocated to more than one virtual address over time from different virtual machines. Some hardware platforms allow setting access controls for the specified region(s) of physical memory, such permissions specifying a manner in which each memory region may be accessed (e.g., write ("W"), read ("R"), execute ("X")), as described below. In some scenarios, one or more of the access controls can be changed such that the usage of specified region(s) of physical memory by software on the physical computer system may be restricted or expanded as needed.

A hardware component—a memory management unit (MMU), which is not shown in FIG. 1—may perform the actual virtual-to-physical address translations, using specialized address translation mechanisms. Example of such mechanisms include, but are not limited to, translation lookaside buffers (TLB) and/or page tables. In this disclosure, these TLBs and page tables are collectively referred to as an operating system (OS) mediated access control mechanism. A page table typically includes one "page table entry" (PTE) for each memory page to map virtual page numbers to physical page numbers in physical memory. A PTE may also include information about whether a memory page has been written to, when a memory page was last used or read, what kind of processes (user mode or kernel mode) may read from (the "R" bit), write to (the "W" bit), and/or execute (the "X" bit) a memory page, and whether a memory page should be cached. A TLB is typically a cache of PTEs and is used to avoid the necessity of accessing the physical memory every time a virtual address is mapped. An example of information describing what kind of processes (user mode or kernel mode) may execute (the "X" bit) a memory page is the NX bit. An OS with support for an NX bit may mark certain areas of memory as non-executable. Thus, when the NX bit has a particular value (e.g., zero or LOW, one or HIGH, etc.), the memory region corresponding to the bit may not be executed regardless of whether the process is operating in user or kernel mode. It is to be appreciated that the embodiments described herein are not limited only to NX bits. Instead, any information describing what kind of processes (user mode or kernel mode) may execute (the "X" bit) a memory page can be used. For brevity, this document uses an NX bit as an example of such information.

Multiple VMs may run simultaneously on a single physical computer system (or host machine), sharing the host machine's hardware resources among the VMs. Each of the VMs may run its own guest operating system and/or software applications, separately from each of the other VMs. Hardware virtualization includes use of a VM monitor (commonly known as a hypervisor) that creates and manages the VMs executing on a computer system's hardware. In such a scenario, the hypervisor also includes specialized address translation mechanisms that are based on second level address translation (SLAT), which is commonly known as nested paging. In this scenario, the specialized address translation mechanisms may be based on extended page tables (EPT) technology and/or rapid virtualization indexing (RVI) technology. In this disclosure, these SLAT data structures, such as EPTs and RVIs, are collectively referred to as a hypervisor (OS) mediated access control mechanism. Address translation mechanisms based on RVI are sometimes known as nested page tables (NPTs). Nested pages enable conversion of a VM's memory page from a guest virtual address, then to a guest physical address, then to a host virtual address, and finally to a host physical address. Generally, each VM's OS includes a page table with the guest virtual addresses and/or guest physical addresses, while an SLAT data structure (e.g., an EPT, an RVI, etc.) on the hypervisor will include the mechanisms for converting the guest virtual addresses and/or the guest physical addresses into the host virtual addresses and/or the host physical address.

Malware, such as the fileless malware 150 shown in FIG. 1, can affect one or more of the endpoint devices 102A-N. Malware presents a serious risk to millions of users of computers running on the endpoint devices 102A-N because it makes the users vulnerable to loss of data and sensitive information, identity theft, and loss of productivity, among others. There are many techniques of protecting the physical and virtual computer systems running on the endpoint devices 102A-N from malware. Nevertheless, protections against malware are relatively more complex and computationally expensive when carried out in hardware virtualization environments as opposed to physical (i.e., non-virtualized) environments. One reason for the extra complexity and computational cost is that, in hardware virtualization configurations, every memory access typically requires an additional level of address translations: a translation from a guest virtual address of the respective VM to the actual physical memory of the computer system's hardware (i.e., a host physical address). In order to reduce or eliminate the extra complexity and computational cost, manufacturers and vendors of hypervisors typically grant control of any hypervisor mediated access control mechanisms (e.g., hypervisors' SLAT mechanisms, etc.) to OS mediated access control mechanisms (e.g., a page table, etc.). Consequently, when an MMU (not shown in FIG. 1) utilizes a hypervisor's SLAT mechanisms (e.g., an EPT, an RVI, etc.) for converting a guest virtual address of the respective VM to the actual physical memory of the computer system's hardware (i.e., a host physical address), any access controls in the VM's guest virtual addresses that are set by an OS mediated access control mechanism (e.g., set in a page table, etc.) are propagated to the host physical addresses in the hypervisor mediated access control mechanism (e.g., in the hypervisor's SLAT mechanisms) and controlled by the OS mediated access control mechanism.

Control of a hypervisor mediated access control mechanism (e.g., SLAT data structures, etc.) by an OS mediated access control mechanism (e.g., page tables, TLBs, etc.) can create a security vulnerability that enables fileless malware to detrimentally affect physical and/or virtual computer systems used in hardware virtualization environments. For example, and with regard to FIG. 1, fileless malware 150 may be injected 153A-B into a running instance of a program associated with a VM implemented on hardware resources of the endpoint device 102A. The fileless malware 150 includes a malicious script or executable in the form of shellcode 151. A shellcode (e.g., shellcode 151, etc.) is a small piece of code that acts as the payload in exploitation of a software vulnerability. The shellcode 151 can, in some scenarios, include an assembly language program that executes a shell on an operating system (OS) of a computer system (e.g., an OS of an endpoint device 102A, etc.) and may be used as an exploit payload for providing an attacker with access to the computer system (e.g., the endpoint device 102A, etc.). With regard to FIG. 1, the shellcode 151 that is injected 153A-B into the endpoint device 102A can start a command shell from which an attacker can use to control the device 102A or even download additional unwanted payload 152 onto the device 102A.

The shellcode 151 can be injected into the endpoint device 102A in one or two ways—via a remote injection mechanism 153A (e.g., communication via one or more of the networks 105, etc.) or via a direct injection mechanism 153B (e.g., through a direct wired connection, etc.). Generally, the injection 153A-B of the shellcode 151 is successful because one or more vulnerabilities of an OS implemented by one or more processors of the endpoint device 102A are exploited. Examples of such exploits include, but are not limited to, buffer overflow exploits (e.g., stack-based exploitation, heap-based exploitation, etc.), structured exception handling exploits (SEH), and return oriented programming (ROP) exploits. In some scenarios, the shellcode 151 can be injected into the endpoint device 102A despite the presence of protection mechanisms created to provide protection against fileless malware. Examples of such protection mechanisms include intrusion detection/prevention systems, firewalls, etc. While these protection mechanisms can sometimes be effective in detecting fileless malware, they generally are not configured to prevent execution of shellcodes (e.g., the shellcode 151, etc.) that have already been injected into the endpoint device 102A.

After the injection 153A-B, the shellcode 151 may cause an access control bit related to execution of a memory page associated with the program (e.g., the NX bit described above) to change in the VM's guest virtual address. This unauthorized change to the access control bit would be propagated to the hypervisor's SLAT mechanisms after conversion of the respective guest virtual address to the actual physical memory of the computer system's hardware (i.e., a host physical address). Consequently, the hardware resources of the endpoint device 102A would execute the shellcode 151, which would in turn detrimentally affect the physical and virtual computer systems running on the endpoint device 102A. One unwanted effect could be that execution of the shellcode 151 causes the hardware resources of the endpoint device 102A to download additional payload 152 from one or more unauthorized sources (not shown), which could include other types of malware that affect the physical and virtual computer systems running on the endpoint device 102A.

Embodiments of the VM locker logic/module 101 described in this document can assist with reducing or eliminating the security vulnerability described above in the immediately preceding paragraphs and with preventing execution of the shellcode 151 after its injection into the endpoint device 102A. For one embodiment, the VM locker logic/module 101 operates using information acquired by a filter driver 205 to prevent execution of shellcode 151. Specifically, the VM locker logic/module 101 causes the execute privileges (e.g., an "NX" bit, etc.) for memory pages implicated by the shellcode 151 that are within a hypervisor mediated access control mechanism to enter into a non-execute state in response to an analysis of the information acquired by the filter driver 205 by the VM locker logic/module 101. In this way, the VM locker logic/module 101 prevents the shellcode 151 from damaging the endpoint device 102A and/or any VMs that exist within the endpoint device 102A. The VM locker logic/module 101's operation is described in further detail below in connection with at least FIG. 1, 2A, 2B, 2C, 3A, or 3B.

Each one of the VM locker logic/modules 101 and the filter drivers 205 can be implemented as at least one of hardware (e.g., electronic circuitry of the processing unit(s), dedicated logic, etc.), software (e.g., one or more instructions associated with a computer program executed by the processing unit(s), software run on a general-purpose computer system or a dedicated machine, etc.), or a combination thereof. For one embodiment, each of the VM locker logic/modules 101 performs one or more embodiments of techniques for protection against fileless malware, as described herein. For one embodiment, each of the filter drivers 205 monitors and intercepts input/output (I/O) requests issued by a running instance of a process executing on the endpoint device 102A (e.g., a process that includes the shellcode 151, etc.). For an embodiment, each of the filter drivers 205 monitors and intercepts disk I/O requests and/or network I/O requests made by processes. That is, each of the filter drivers 205 monitors the processes that are using disk and/or network services (e.g., to receive data from outside of the endpoint devices 102A-N, etc.), and reports these processes to a respective one of the VM locker logic/modules 101. For one embodiment, the intercepted requests are provided together with an identifier of the requesting process (e.g., a process ID, etc.) to the VM locker logic/module 101. Next, the VM locker logic/module 101 generates an information log as a list of the identified processes. The information log can include the process IDs, the locations of memory regions associated with the processes, and the sizes of each identified memory region. When a process (e.g., a process that includes the shellcode 151, etc.) requests execution of data within a memory page residing in the memory of an endpoint device (e.g., endpoint device 102A, etc.), the VM locker logic/module 101 can deny the request based on determining that the requesting process is listed in the information log as an unauthorized process. In this way, the VM locker logic/modules 101 can prevent execution of shellcode 151 that is injected into a process 210.

The filter driver 205 can be any electronic component (e.g., software, hardware, or combination thereof, etc.) capable of monitoring disk I/O and/or network I/O requests. Examples include, but are not limited to, a network filter driver and a disk filter driver. A network filter driver monitors and intercepts network I/O requests made by running instances of processes (i.e., programs). A disk filter driver monitors and intercepts disk I/O requests made by running instances of processes (i.e., programs).

For some embodiments, each of the VM locker logic/modules 101 of the endpoint devices 102A-N is implemented as part of or by one or more special-purpose processors with tamper resistance features. These types of specialized processors are commonly known as tamper resistant processors. Examples of such special-purpose processors include a trusted platform module (TPM) cryptoprocessor, an application specific integrated circuit (ASIC), an application-specific instruction set processor (ASIP), a field programmable gate array (FPGA), a digital signal processor (DSP), any type of cryptographic processor, an embedded processor, a co-processor, or any other type of logic with tamper resistant features that is capable of processing instructions. In this way, the VM locker logic/modules 101 can be implemented and maintained in a secure manner that assists with minimizing or preventing security vulnerabilities. For a further embodiment, the VM locker logic/modules 101 may be maintained separately from the components 130A-N. For example, the VM locker logic/modules 101 may be implemented as one or more special-purpose processors that is separate from the components 130A-N. For a specific embodiment, at least one of the VM locker logic/modules 101 is implemented in a trusted execution environment (TEE) of one or more processors of the endpoint devices 102A-N. Examples of TEEs can be included in processors and/or cryptoprocessors based on Intel Software Guard Extensions (SGX) technology, processors and/or cryptoprocessors based on Intel Converged Security and Manageability Engine (CSME) technology, processors and/or cryptoprocessors based on Intel Trusted Execution Technology (TXT) technology, processors and/or cryptoprocessors based on Trusted Platform Module (TPM) technology, processors and/or cryptoprocessors based on ARM TrustZone technology, etc. In this way, the TEE acts as an isolated environment for the VM locker logic/modules 101 that runs in parallel with the other computer programs (e.g., software, firmware, etc.) installed on the endpoint devices 102A-N. For one example, one or more of a VM locker logic/module 101 and a filter driver 205 can be implemented in a TEE of a TPM cryptoprocessor, an ASIC, an ASIP, an FPGA, a DSP, any type of cryptographic processor, an embedded processor, a co-processor, or any other type of logic with tamper resistance features that is capable of processing instructions.

The endpoint devices 102A-N may communicate within the infrastructure 100 via one or more networks 105. These network(s) 105 comprise one or more different types of computer networks, such as the Internet, enterprise networks, data centers, fiber networks, storage networks, WANs, and/or LANs. Each of the networks 105 may provide wired and/or wireless connections between the devices 102A-N that operate in the electrical and/or optical domain, and also employ any number of network communication protocols (e.g., TCP/IP). For example, one or more of the networks 105 within the infrastructure 100 may be a wireless fidelity (Wi-Fi®) network, a Bluetooth® network, a Zigbee® network, and/or any other suitable radio based network as would be appreciated by one of ordinary skill in the art upon viewing this disclosure. (WI-FI is a registered trademark of the Wi-Fi Alliance; BLUETOOTH is a registered trademark of Bluetooth SIG; ZIGBEE is a registered trademark of ZigBee Alliance.). Those having ordinary skill in the art will appreciate that the network(s) 105 may also include any required networking hardware, such as network nodes that are configured to transport data over network(s) 105. Examples of network nodes include, but are not limited to, switches, gateways, routers, network bridges, modems, wireless access points, networking cables, line drivers, switches, hubs, and repeaters.

One or more of the networks 105 within the infrastructure 100 may be configured to implement virtual private network (VPN) and/or cloud based networking. For one embodiment, at least one of the endpoint devices 102A-N comprises one or more virtual machines (VMs), containers, and/or other types of virtualized computing systems for processing computing instructions and transmitting and/or receiving data over network(s) 105. Furthermore, at least one of the endpoint devices 102A-N may be configured to support a multi-tenant architecture, where each tenant may implement its own secure and isolated virtual network environment.

For some embodiments, the network(s) 105 comprise a cellular network for use with at least one of the endpoint devices 102A-N. For this embodiment, the cellular network may be capable of supporting a variety of the endpoint devices 102A-N that include, but are not limited to computers, laptops, and/or a variety of mobile devices (e.g., mobile phones, self-driving vehicles, ships, and drones). The cellular network can be used in lieu of or together with at least one of the other networks 105 described above.

Figure 2A:
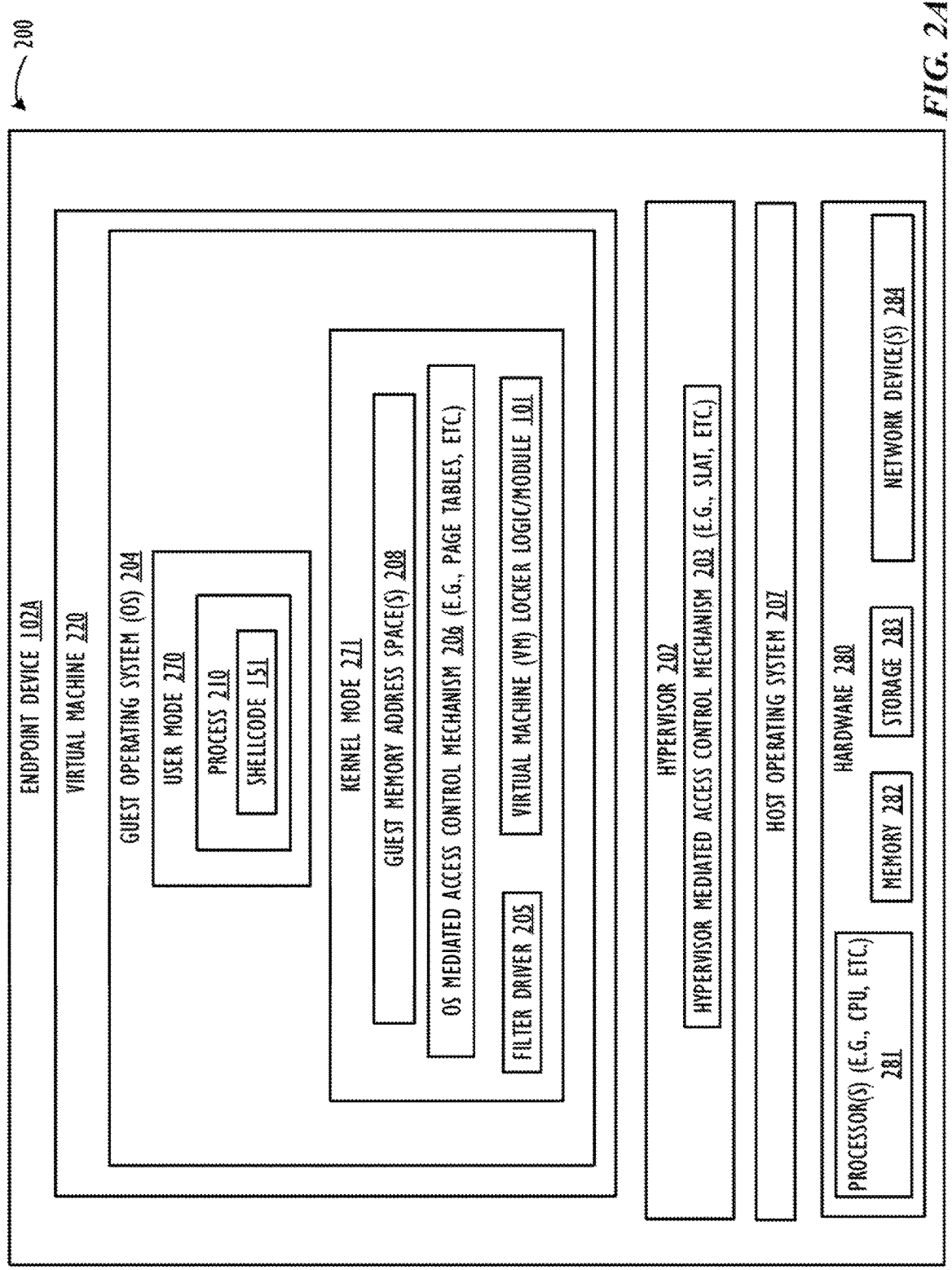

Referring now to FIG. 2A, which illustrates an embodiment of a virtualization architecture 200 configured to prevent execution of a shellcode 151 after its injection into an endpoint device 102A. The virtualization architecture 200 of FIG. 2A may reference one or more components of FIG. 1. For brevity, components that were described above in connection with FIG. 1 will not be described again in connection with FIG. 2A unless such description is necessary. Also, the descriptions provided herein in connection with FIG. 2A will sometimes focus on endpoint device 102A of FIG. 1. These descriptions also apply to one or more of endpoint devices 102B-N of FIG. 1. Furthermore, FIG. 2A shows the endpoint device 102A as including only one VM 220, but it is to be appreciated that more than one VM can exist within the endpoint device 102A.

The virtualization architecture 200 may be based on the endpoint device 102A of FIG. 1. As shown in FIG. 2A, the virtualization architecture 200 comprises hardware components 280 of the endpoint device 102A, which are used to implement a host OS 207, a hypervisor 202, and a VM 220. The hardware components 280 may include, but are not limited to, processing units 281, memory 282, storage device(s) 283, network device(s) 284, etc. The processing units 281 can include any type of processor known in the art (e.g., central processing units (CPUs), etc.). The memory 282 can include any type of memory known in the art (e.g., random access memory (RAM), read only memory (ROM), etc.). The storage device(s) 283 can include any type of known storage devices (e.g., non-transitory computer readable storage mediums, etc.). The network device(s) 284 can include any type of known network devices and/or interfaces that enable wired and/or wireless communication.

The hardware components 280 can be used to implement a host OS 207 that is the primary and first installed OS of the architecture 200. In one scenario, the host OS 207 may implement and interact directly with a hypervisor 202 such that the hypervisor 202 does not interact directly with the hardware components 280. In this scenario, the hypervisor 202 depends on OS services, is implemented using the hardware components 280 and can, for example, be a Type 2 hypervisor that runs as a software application in an underlying operating system. In another scenario, the hypervisor 202 is a Type 1 hypervisor that runs directly on hardware 280 without interacting directly with the host OS 207, and may be implemented using firmware. The hypervisor 202 is used to create and manage one, two, or any number of the VMs 220. For brevity, only one VM 220 is shown in FIG. 2A. The hypervisor 202 may allocate processor resources, memory resources, and other computing resources for the VM 220. If two or more VMs are present in endpoint device 102A, the hypervisor 202 prevents the multiple VMs from disrupting each other. As shown, the hypervisor 202 includes a hypervisor mediated access control mechanism 203, which is described in further detail below.

The VM 220 includes a guest OS 204. A difference between the host OS 207 and the guest OS 204 is that the host OS 207 is an OS for the host machine (i.e., the endpoint device 102A) while the guest OS 204 is an OS for a guest machine (i.e., the VM 220). The guest OS 204 may be allocated one or more guest memory address spaces 208. For example, each guest memory address space 208 may be a virtual address space that the guest OS 204 presents to one or more applications running on the guest OS 204.

For one embodiment, one or more components of the hardware 280 can be configured to perform hardware-assisted virtualization in order to map guest virtual addresses within the spaces 208 of the guest OS 204 to host physical addresses located in the host memory 282 of the endpoint device 102A. Such mapping can be performed via the OS mediated access control mechanism 206 and the hypervisor mediated access control mechanism 203. Each of the access control mechanisms 203 and 206 may enable such mapping via pages tables, TLBs, and SLAT or nested paging. For one embodiment, the OS mediated access control mechanism 206 includes pages tables and/or TLBs. Here, the pages tables and/or TLBs that make up the OS mediated access control mechanism 206 can provide the guest virtual addresses and/or guest physical addresses within spaces 208 to the hypervisor mediated access control mechanism 203. For this embodiment, the hypervisor mediated access control mechanism 203 maps the guest virtual addresses and/or guest physical addresses within spaces 208 to physical addresses found in the host memory (e.g., physical memory 282). For one embodiment, the hypervisor mediated access control mechanism 203 includes SLAT data structures that implement SLAT to reduce hypervisor overhead by reducing the number of look-up operations performed by hardware components 280 (e.g., by processor(s) 281, etc.). The SLAT data structures that make up the hypervisor mediated access control mechanism 203 may perform SLAT to provide address translation without invoking the hypervisor 202 to perform page mapping, such as shadow page mapping. Examples of SLAT data structures that can act as the hypervisor mediated access control mechanism 203 include EPTs and RVIs. For example, an EPT 203 of the hypervisor 202 can be used for mapping virtual addresses (e.g., guest virtual addresses within spaces 208, etc.) from the guest OS 204 located in the page tables 206 to the host physical memory addresses (e.g., host physical addresses) of the memory 282. Persons of ordinary skill in the art are aware that the OS mediated access control mechanism 206 (e.g., pages tables, TLBs, etc.) and the hypervisor mediated access control mechanism 203 (e.g., SLAT data structures, etc.) are associated with an MMU, which is not shown in FIG. 2A. An MMU may be part of a processor (e.g., the processor(s) 281, etc.)

For one embodiment, the access control mechanisms 203 and 206 provide two levels of paging, where the first level of paging translates guest virtual addresses within the spaces 208 of the OS 204 to guest physical addresses and the second level of paging translates the guest physical addresses to host physical addresses within the memory 282. For one embodiment, the OS mediated access control mechanism 206 may perform the first level of paging and the hypervisor mediated access control mechanism 203 may perform the second level of paging. In this way, the SLAT data structures of the hypervisor mediated access control mechanism 203 may consider the guest physical address as a host virtual address such that a non-virtualized memory block (e.g., a guest page table) can be mapped to a host memory block (e.g., a host page table). As hardware-assisted virtualization, the SLAT data structures (i.e., the hypervisor mediated access control mechanism 203) may be communicatively coupled to or integrated within the hardware components 280 such that the memory address translations are stored within the hardware components 280 (e.g., the processor(s) 281 and/or the memory 282 of the hardware components 280, etc.).

For some embodiments, the guest OS 204 can operate in two different modes—a user mode 270 and a kernel mode 271. In the user mode 270, a running instance of a program (e.g., process 210, etc.) is forbidden from accessing those portions of memory (e.g., memory 282, etc.) that have been allocated to the guest OS 204's kernel or to other programs. The guest OS 204's kernel is not a process, but rather a controller of processes, and it alone has access to all resources on the system (i.e., the endpoint device 102A). When a user mode process (e.g., the process 210 currently in user mode 270, etc.) wants to use a service that is provided by its respective guest OS 204's kernel (e.g., in order to access system resources other than the limited memory space that is allocated to the process 210), a processing unit (e.g., a CPU 281, etc.) executing the process 210 in user mode 270 must switch temporarily into a privileged, kernel mode 271.

In contrast to the user mode 270, a processing unit (e.g., a CPU 281, etc.) in the kernel mode 271 assumes that a running instance of a process 210 is trusted software. Consequently, the process 210 in kernel mode 271 can reference any memory addresses (i.e., locations in memory 282). The kernel, which is the core of the OS 204 and has complete control over everything that occurs in the system (i.e., the endpoint device 102A), is trusted software, but all other programs are considered untrusted software. Thus, all user mode software must request use of the kernel by means of a system call in order to perform privileged instructions, such as process creation or input/output operations. When a running instance of a program (e.g., process 210, etc.) makes a request to the kernel in an OS (e.g., OS 204, etc.) for a service performed by the kernel, such a request is known as a system call. When a user process (e.g., process 210, etc.) runs a portion of the kernel code via a system call, the process 210 temporarily becomes a kernel process and is in kernel mode 271. While in kernel mode 271, the process 210 will have root (i.e., administrative) privileges and access to key system resources (e.g., key regions of memory 282, etc.). The entire kernel, which is not a process but a controller of processes, executes only in kernel mode 271. When the kernel has satisfied the request by a process (e.g., process 210, etc.), it returns the process 210 to user mode 270. Some CPUs, including the nearly ubiquitous x86-compatible (i.e., Intel-compatible) processors, are designed to accommodate more than two execution modes. However, this disclosure assumes that all standard kernels in an OS (e.g., OS 204, etc.) utilize at least the kernel mode 271 and user mode 270.

As shown in FIG. 2A, the process 210 includes the shellcode 151, which can be injected into the endpoint device 102A via injection techniques 153A-B, which are described above in connection with FIG. 1. In some scenarios, the shellcode 151 can be injected into the process 210 despite the presence of protection mechanisms in the architecture 200 (not shown) aimed at preventing and/or detecting the injection. In such a scenario, the shellcode 151 can cause the process 210 to request execution of the shellcode 151 in kernel mode 271 via a system call, as described above. Here, the hypervisor mediated access control mechanism 203 may be completely controlled by the OS mediated access control mechanism 206. Thus, and in this scenario, the hypervisor mediated access control mechanism 203 is configured to always allow any execute requests received from the guest OS 204A to proceed based on an assumption that the guest OS 204's OS mediated access control mechanism 206 manages the execute privileges (e.g., an "NX" bit, etc.) associated with such requests.

For one or more embodiments, the scenario described in the immediately preceding paragraph can be minimized or eliminated via use of the VM locker logic/module 101. For one embodiment, the VM locker logic/module 101 operates using information acquired by the filter driver 205 to prevent execution of shellcode 151. For an embodiment, the filter driver 205 monitors and intercepts I/O requests (e.g., disk I/O requests, network I/O requests, etc.) associated with the injection of data from one or more external sources into the endpoint device 102A. The data from the external source(s) may or may not include malware. Examples of such I/O requests include network I/O requests corresponding to the injection of shellcode 151 into process 210.

For an embodiment, the filter driver 205 utilizes one or more hooking techniques to monitor and intercept any data being received by endpoint device 102A (e.g., data received by the VM 220, etc.) from outside the endpoint device 102A. In this way, any data that is external to the endpoint device 102A is flagged. As used herein, a "hooking technique" and its variations refer to a range of techniques used to alter or augment the behavior of an OS, of applications, or of other software components by intercepting function calls (e.g., system calls, etc.), messages, or events passed between software components. Code that handles such intercepted function calls, events or messages is called a "hook." The filter driver 205's hooks may be used to track one or more of: (i) data that is received by the endpoint device 102A via network I/O operations; and (ii) data that is received by the endpoint device 102A via disk I/O operations. The data received by the endpoint device 102A via network I/O operations and/or via disk I/O operations may or may not include malware. The filter driver 205 can, for example, include a network filter driver and a disk filter driver.

The filter driver 205 may communicate intercepted I/O requests to the VM locker logic/module 101. For one embodiment, a hypercall can be used to pass the information gathered by the filter driver 205 to the hypervisor 202. A hypercall is a software trap from the VM 220 to the hypervisor 202. The VM 220 can use a hypercall to request privileged operations, like updating the hypervisor mediated access control mechanism 203 (e.g., SLAT data structures such as EPTs, RVIs, etc.).

For one embodiment, the VM locker logic/module 101 generates an information log using the information acquired by the filter driver 205. Specifically, the VM locker logic/module 101 generates the information log by: (i) creating a process identifier (e.g., a process ID, etc.) for the process (e.g., the process 210, etc.) that data from an external source was injected into (e.g., the shellcode 151, etc.); and (ii) associating the locations of memory regions within the memory 282 that correspond to the process and the sizes of these identified memory regions with the created process identifier.

When the shellcode 151 causes the process 210 to request execution of the shellcode 151 in kernel mode 271 via a system call, the VM locker logic/module 101 verifies, via the previously created information log, that the process 210 making the execution request is a process that includes data received from outside the endpoint device 102A. In response to the VM locker logic/module 101's verification, the VM locker logic/module 101 directs the hypervisor mediated access control mechanism 203 to prevent execution of the shellcode 151. Specifically, the VM locker logic/module 101 causes the execute privileges (e.g., an "NX" bit, etc.) within the hypervisor mediated access control mechanism 203 for memory pages implicated by the shellcode 151 to enter into a non-execute state in response to the verification. In this way, the VM locker logic/module 101 prevents the shellcode 151 from damaging the VM 220 and/or the endpoint device 102A.

With regard now to FIG. 2B, which illustrates an embodiment of a virtualization architecture 250 configured to prevent execution of a shellcode 151 after its injection into an endpoint device 102A. The virtualization architecture 250 of FIG. 2B includes many of the same components described above in connection with the virtualization architecture 200 of FIG. 2A. For brevity, only the differences between virtualization architectures 250 and 200 are described below in connection with FIG. 2B. Also, the descriptions provided herein in connection with FIG. 2B will sometimes focus on endpoint device 102A of FIG. 1. These descriptions also apply to one or more of endpoint devices 102B-N of FIG. 1. Furthermore, FIG. 2B shows the endpoint device 102A as including only one VM 220, but it is to be appreciated that more than one VM can exist within the endpoint device 102A.

One difference between the virtualization architectures 250 and 200 is that the VM locker logic/module 101 is implemented by the hypervisor 202 in the architecture 250, while the VM locker logic/module 101 is implemented by the guest OS 204 in the architecture 200. For one embodiment of the architecture 250, the filter driver 205 may communicate intercepted I/O requests to the VM locker logic/module 101 implemented by the hypervisor 202 via hypercalls (as described above).

With regard now to FIG. 2C, which illustrates an embodiment of a virtualization architecture 275 configured to prevent execution of a shellcode 151 after its injection into an endpoint device 102A. The virtualization architecture 275 of FIG. 2C includes many of the same components described above in connection with the virtualization architectures 200 and 250 of FIGS. 2A and 2B, respectively. For brevity, these components are not described again unless such description is necessary. Also, the descriptions provided herein in connection with FIG. 2C will sometimes focus on endpoint device 102A of FIG. 1. These descriptions also apply to one or more of endpoint devices 102B-N of FIG. 1. Furthermore, FIG. 2C shows the endpoint device 102A as including only one container 251, but it is to be appreciated that more than one container can exist within the endpoint device 102A.

The virtualization architecture 275 differs from the architectures 200 and 250 of FIGS. 2A and 2B, respectively, because of the following: (i) the VM locker logic/module 101 is implemented by the host operating system 207 because there is no hypervisor in the architecture 275; (ii) the architecture 275 includes containers (e.g., the container 251, etc.); and (iii) the architecture 275 includes no VMs. In the architecture 275, the host OS 207's user mode (not shown in FIG. 2C) is used to manage the container host (i.e., the endpoint device 102A shown in FIG. 2C) and to create the container 251. If more than two containers exist within the endpoint device 102A, then each container will have its own user mode that is distinct and separate from the other container's user mode. As shown in FIG. 2C, the process 210 is implemented within the container 251 (e.g., an OS container, an application container, etc.) instead of a VM. In the architecture 275, the container 251 includes only a user mode 270 and no kernel mode 271. For one embodiment, the container 251 allows processes (e.g., process 210 that includes the shellcode 151, etc.) running within the container 251 to be executed only in user mode 270. For one embodiment, the architecture 275 is designed so that any processes requiring kernel execution privileges must be implemented in the host operating system 207's kernel (i.e., kernel model 271). For this embodiment of the architecture 275, the VM locker/logic 101, the filter driver 205, guest memory address space(s) 208, a primary access control mechanism 206, and a secondary access control mechanism 203 are all implemented in the host operating system 207's kernel (i.e., kernel model 271). The VM locker/logic 101, the filter driver 205, guest memory address space(s) 208 are described above in connection with FIGS. 1-2B, so they are not described again for brevity. For one or more embodiments, the primary access control mechanism 206 is similar to or the same as the OS mediated access control mechanism 206 described above in connection with FIGS. 1-2B. For one or more embodiments, the secondary access control mechanism 203 is similar to or the same as the hypervisor mediated access control mechanism 203 described above in connection with FIGS. 1-2B. For brevity, access control mechanisms 203 and 206 are not described again.

Those having ordinary skill in the art will appreciate that one or more of the architectures 200, 250, and 275 may be combined or modified. For a first example, architectures 200 and 275 can be combined such that a VM 220's guest OS 204 is used to create and manage containers (e.g., container 251, etc.) and a hypervisor 202 is used to control and manage the VM 220. For a second example, architectures 250 and 275 can be combined such that a VM 220's guest OS 204 is used to create and manage containers (e.g., container 251, etc.) and a hypervisor 202 is used to control and manage the VM 220. For a third example, each of architectures 200 or 250 can be modified such that the hypervisor 202 is used to implement containers (e.g., container 251, etc.) without using services of the host OS 207 or the guest OS 204. For a fourth example, each of architectures 200 or 250 can be modified such that the hypervisor 202 is used to implement containers (e.g., container 251, etc.) and VMs (e.g., VM 220, etc.), where the containers are separate from the VMs and where the hypervisor 202 implements the containers without using services of the host OS 207 or the guest OS 204. For a fifth example, each of architectures 200 or 250 can be modified such that the hypervisor 202 is used to implement containers (e.g., container 251, etc.) and VMs (e.g., VM 220, etc.), where at least one of the containers is implemented within a VM's guest OS 204. The examples provided in this paragraph are merely illustrative. More modifications and/or combinations are possible.

Figure 3A:
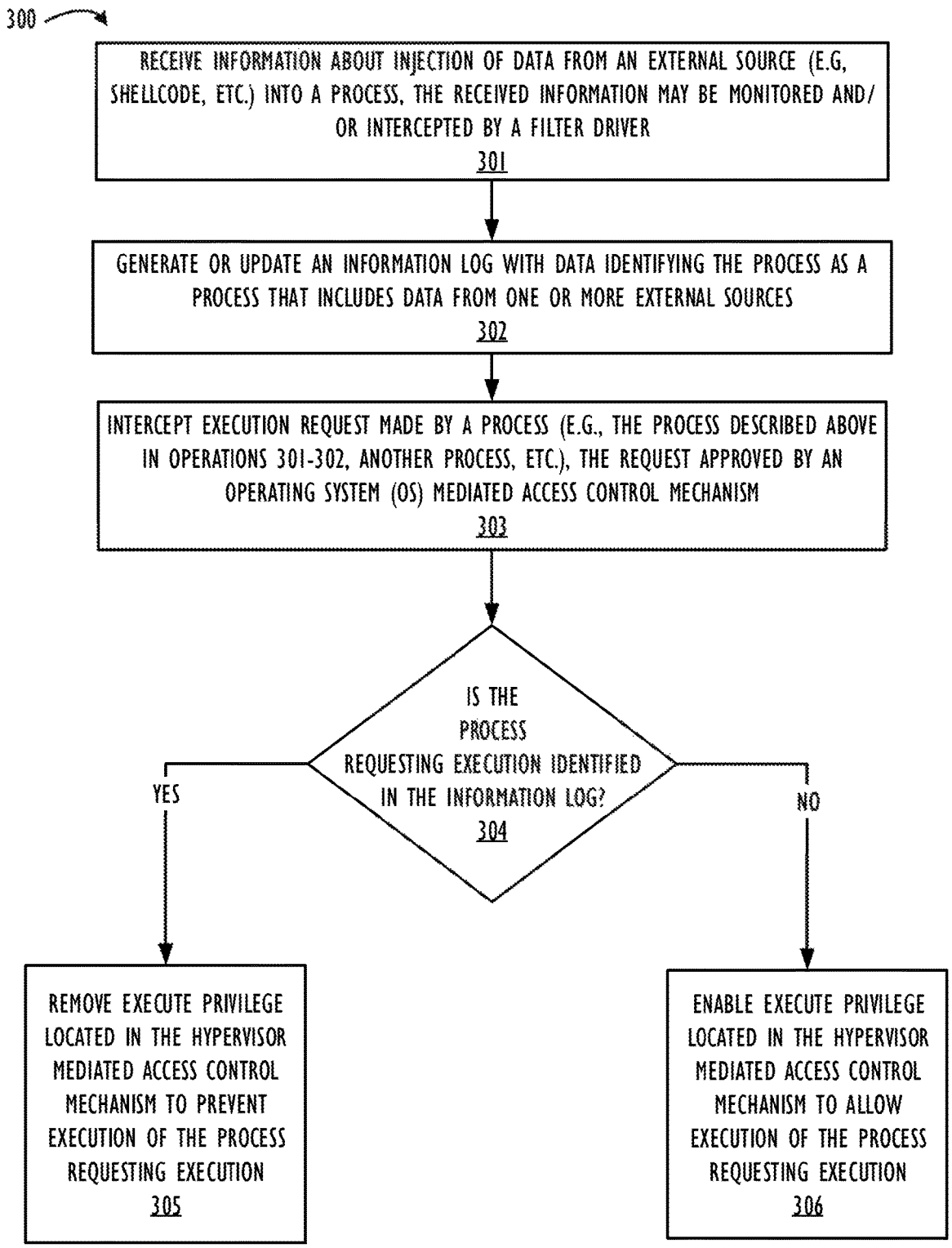
FIG. 3A-3B are flowcharts illustrating techniques for preventing execution of the shellcode shown in FIGS. 2A-2C in accord with several embodiments.

Referring now to FIG. 3A, which illustrates a technique 300 in flowchart form for preventing execution of a shellcode 151 that has been injected into the process 210. The technique 300 is performed by one or more components of the endpoint device 102A shown in one or more of FIGS. 2A-2C (e.g., the VM locker logic/module 101, the filter driver 205, etc.). As described above, each of these components may be implemented by the hardware 280 of one or more of FIGS. 2A-2C (e.g., the processor(s) 281, etc.) or may be software stored in the memory 282 of one or more of FIGS. 2A-2C and executed by the processor(s) 281 of one or more of FIGS. 2A-2C.

Technique 300 begins at operation 301. Here, the VM locker logic/module 101 receives information comprising I/O requests (e.g., disk I/O requests, network I/O requests, etc.) associated with the injection of data from an external source into the process 210. Such data can, for example, be shellcode 151, other malicious data, non-malicious data, etc. As explained above in connection with one or more of FIGS. 1-2C, the filter driver 205 monitors and intercepts the information comprising I/O requests and communicates this information to the VM locker logic/module 101. The data received by the endpoint device 102A via network I/O operations and/or via disk I/O operations may or may not include malware. Next, at operation 302, the VM locker logic/module 101 generates or updates an information log by creating an entry for the process 210 in the information log. For one embodiment, the VM locker logic/module 101 generates the entry in the information log by: (i) creating a process identifier (e.g., a process ID) for the process that data from one or more external sources (e.g., the shellcode 151, etc.) was injected into (e.g., the process 210); and (ii) associating the locations of the memory regions within the memory 282 that correspond to the process 210 and the sizes of these identified memory regions with the created process identifier. Technique 300 also includes operation 303. Here, the VM locker logic/module 101 intercepts an execution request made by a process (e.g., process 210, etc.) for execution of code (e.g., shellcode 151, etc.) within the process in a kernel mode 271 via a system call. At this stage, and assuming the process requesting execution is the process 210, the shellcode 151 within the process 210 may access an execute privilege set by the OS mediated access control mechanism 206 (e.g., a page table, a TLB, etc.) and change its value so that the shellcode 151 can be executed. Unlike prior art systems, the execution request is not performed immediately. Instead, the execution request is intercepted by the VM locker logic/module 101. Next, at operation 304, the VM locker logic/module 101 determines whether the process requesting execution (e.g., process 210 that includes the shellcode 151, etc.) is identified in the previously created information log (i.e., the log created at operation 302). For one embodiment that assumes the process requesting execution is the process 210, the VM locker logic/module 101 determines whether a process identifier of the process 210 requesting execution of the shellcode 151 exists in the information log created at operation 302. For one embodiment, this verification includes the VM locker logic/module 101 determining whether memory regions associated with execution request are included in the information log. When the VM locker logic/module 101 identifies a match between memory regions implicated by the execution request and memory regions identified in the information log, then the VM locker logic/module 101 determines that the process requesting execution is the process 210 associated with the memory regions that were identified in the information log.

Technique 300 proceeds to operation 305 in response to the VM locker logic/module 101 identifying the process 210 as one of the processes in the information log created at operation 302. Here, the VM locker logic/module 101 removes the execution privilege associated with the process 210 from the hypervisor mediated access control mechanism 203. For example, the VM locker logic/module 101 removes execute privileges located in the hypervisor mediated access control mechanism 203 that correspond to memory pages implicated by the process 210 by changing the execute bits of relevant memory addresses in the hypervisor mediated access control mechanism 203 (e.g., EPT, RVI, etc.) to a no-execute state. For example, an NX bit in the hypervisor mediated access control mechanism 203 associated with the process 210 can be changed to a particular value (e.g., low or ZERO, one or HIGH, etc.) to prevent execution of the process 210.

On the other hand, technique 300 proceeds to operation 306 when the VM locker logic/module 101 determines that the process requesting execution of code is not included in the information log created at operation 302. Here, the VM locker logic/module 101 enables execute privileges located in the hypervisor mediated access control mechanism 203 that correspond to memory pages implicated by the process. This is achieved by changing the execute bits of relevant memory addresses in the hypervisor mediated access control mechanism 203 (e.g., EPT, RVI, etc.) to an execute state. For example, an NX bit in the hypervisor mediated access control mechanism 203 associated with the process 210 can be changed to a particular value (e.g., low or ZERO, one or HIGH, etc.) to enable execution of the process 210.

For one embodiment, the information log generated by the VM locker logic/module 101 includes information about any and all data received by the endpoint device 102A from one or more external sources regardless of whether such data includes malware or not. Thus, and for this embodiment, technique 300 operates to prevent execution of processes without any knowledge of whether those processes actually include malware. Consequently, and for this embodiment, a process that may include non-malicious data from one or more external sources (e.g., a required software update from a known trusted source, etc.) may be denied execution. Technique 350 of FIG. 3B, which is described below, is directed to minimizing or eliminating scenarios where processes that include only non-malicious data are denied execution by a VM locker logic/module 101.

Figure 3B:
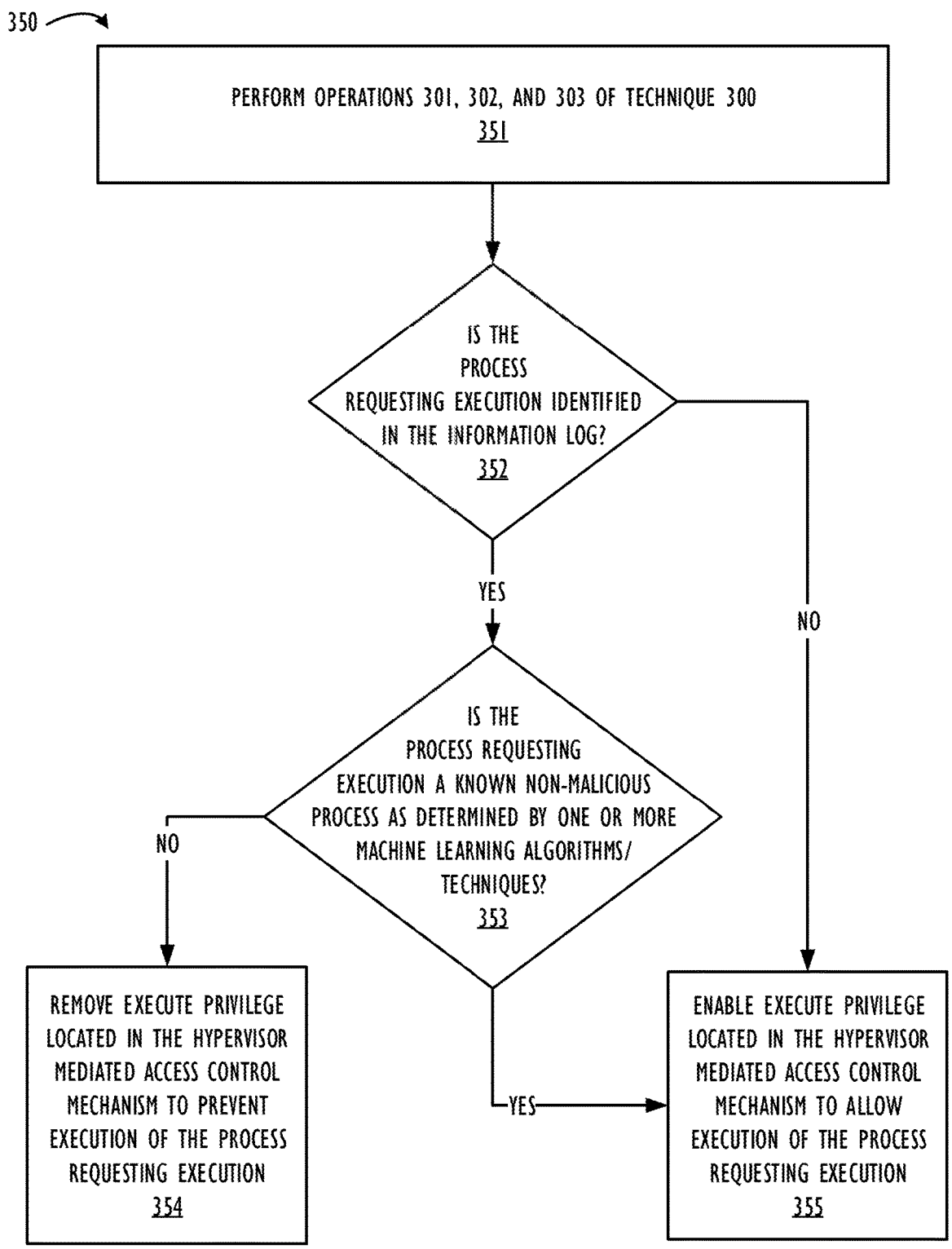

Referring now to FIG. 3B, which illustrates a technique 350 in flowchart form for preventing execution of a shellcode 151 that has been injected into the process 210. The technique 350 is similar to the technique 300 described above in connection with FIG. 3A. For brevity, only the differences between technique 300 and technique 350 are described below in connection with FIG. 3B. The technique 350 is performed by one or more components of the endpoint device 102A shown in one or more of FIGS. 2A-2C (e.g., the VM locker logic/module 101, the filter driver 205, etc.). As described above, each of these components may be implemented by the hardware 280 of one or more of FIGS. 2A-2C (e.g., the processor(s) 281, etc.) or may be software stored in the memory 282 of one or more of FIGS. 2A-2C and executed by the processor(s) 281 of one or more of FIGS. 2A-2C.

Technique 350 begins at operation 351. Here, the VM locker logic/module 101 performs the operations 301, 302, and 303 of technique 300 described above in connection with FIG. 3A. Each of these operations is not described again. Next, at operation 352, the VM locker logic/module 101 determines whether the process requesting execution (e.g., process 210 that includes the shellcode 151, etc.) is identified in the previously created information log (i.e., the log created at operation 302). For one embodiment using process 210 as an example, the VM locker logic/module 101 determines whether a process identifier of the process 210 requesting execution of the shellcode 151 exists in the information log created at operation 302. For one embodiment, this verification includes the VM locker logic/module 101 determining whether memory regions associated with execution request are included in the information log. When the VM locker logic/module 101 identifies a match between memory regions implicated by the execution request and memory regions identified in the information log, then the VM locker logic/module 101 determines that the process requesting execution is the process 210 associated with the memory regions that were identified in the information log.

Technique 350 proceeds to operation 353 in response to the VM locker logic/module 101 identifying the process requesting execution (e.g., the process 210, etc.) as one of the processes in the information log created at operation 302. At operation 353, the VM locker logic/module 101 applies one or more machine learning algorithms or techniques to determine whether the process requesting execution (e.g., the process 210, etc.) is a known non-malicious process. For example, the VM locker logic/module 101 may apply one or more machine learning algorithms or techniques (e.g., machine learning algorithms or techniques based on data provenance, etc.) to determine one or more relevant characteristics of data that is received from an external source and part of a process requesting execution. Examples of such characteristics include, but are not limited to, the data's origins, what happens to it, and where it moves over time. For one or more embodiments, the VM locker logic/module 101 uses data provenance (which provides a historical record of data and its origins) to determine whether the data received from an external source is similar to non-malicious historical data. For a specific embodiment, the VM locker logic/module 101 can determine based on a comparison of the data received from the external source and the historical data that a similarity between the data received from an external source and the historical data is within a threshold degree of similarity. In response to this determination, the VM locker logic/module 101 can determine that the process requesting execution of the data received from an external source is a known non-malicious process. For example, the VM locker logic/module 101 can determine based on a comparison of shellcode 151 and non-malicious historical data that a similarity between the shellcode 151 and the historical data is not within a threshold degree of similarity. For this example, the historical data could be data related to software patches received from one or more known trusted external sources. In response to this determination, the VM locker logic/module 101 can determine that the process 210 requesting execution of the shellcode 151 is not a known non-malicious process because the shellcode 151 is not similar to or the same as the data related to software patches that is received from one or more known trusted external sources.

Technique 350 proceeds to operation 354 in response to the VM locker logic/module 101 identifying the process 210 as a process that is not a known non-malicious process. Here, the VM locker logic/module 101 removes the execution privilege associated with the process 210 from the hypervisor mediated access control mechanism 203. For example, the VM locker logic/module 101 removes execute privileges located in the hypervisor mediated access control mechanism 203 that correspond to memory pages implicated by the process 210 by changing the execute bits of relevant memory addresses in the hypervisor mediated access control mechanism 203 (e.g., EPT, RVI, etc.) to a no-execute state. For example, an NX bit in the hypervisor mediated access control mechanism 203 associated with the process 210 can be changed to a particular value (e.g., low or ZERO, one or HIGH, etc.) to prevent execution of the process 210.

On the other hand, technique 350 proceeds to operation 355 when the VM locker logic/module 101 determines that the process requesting execution of code is not included in the information log created at operation 352 and/or when the process requesting execution of code is identified as a known non-malicious process at operation 353. Here, the VM locker logic/module 101 enables execute privileges located in the hypervisor mediated access control mechanism 203 that correspond to memory pages implicated by the process. This is achieved by changing the execute bits of relevant memory addresses in the hypervisor mediated access control mechanism 203 (e.g., EPT, RVI, etc.) to an execute state. For example, an NX bit in the hypervisor mediated access control mechanism 203 associated with the process 210 can be changed to a particular value (e.g., low or ZERO, one or HIGH, etc.) to enable execution of the process 210.

As shown above in FIGS. 1, 2A-2C, and 3A-3B, one or more embodiments of the VM locker logic/module 101 is configured to cause the hypervisor mediated access control mechanism 203 of the hypervisor 202 to deny one or more execute requests received from the process 210 of the guest OS 204 based on an assumption that the process 210 requesting such execution has been comprised by a shellcode 151. This assumption, as explained above, is based on the filter driver 205's tracking of processes that include data received by the endpoint device 102A from one or more external sources (e.g., via a network or wired communication that is external to the endpoint device 102A, etc.). For some embodiments, the VM locker logic/module 101 can use one or more machine learning algorithms/techniques to determine when to cause the hypervisor mediated access control mechanism 203 of the hypervisor 202 to deny one or more execute requests received from the process 210 of the guest OS 204, as described above in connection with technique 350 of FIG. 3B.

Figure 4:
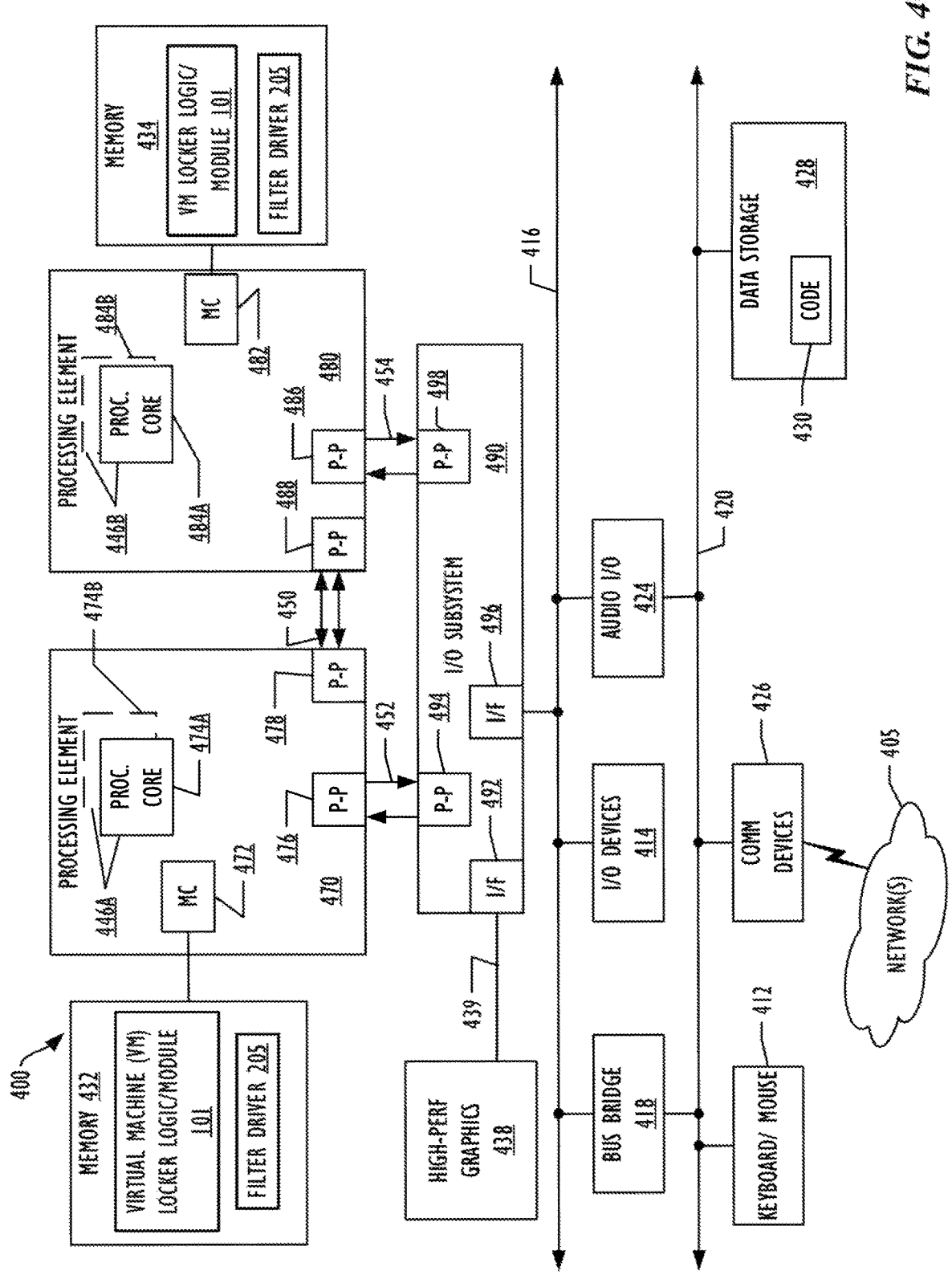
FIG. 4 is a block diagram illustrating a programmable device for use with one or more of the techniques described herein according to one embodiment.

FIG. 4 is a block diagram that illustrates a programmable device 400, which may be used to implement the techniques described herein in accordance with one or more embodiments (e.g., infrastructure 100, virtualization architecture 200, virtualization architecture 250, virtualization architecture 275, technique 300, technique 350, one or more combinations thereof, one or more modifications thereof, etc.). The programmable device 400 illustrated in FIG. 4 is a multiprocessor programmable device that includes a first processing element 470 and a second processing element 480. While two processing elements 470 and 480 are shown, an embodiment of programmable device 400 may also include only one such processing element or more two of such processing elements.

Programmable device 400 is illustrated as a point-to-point interconnect system, in which the first processing element 470 and second processing element 480 are coupled via a point-to-point interconnect 450. Any or all of the interconnects illustrated in FIG. 4 may be implemented as a multi-drop bus rather than point-to-point interconnects.

As illustrated in FIG. 4, each of processing elements 470 and 480 may be multicore processors, including first and second processor cores (i.e., processor cores 474A and 474B and processor cores 484A and 484B). Such cores 474A, 474B, 484A, 484B may be configured to execute computing instruction code. However, other embodiments may use processing elements that are single core processors as desired. In embodiments with multiple processing elements 470, 480, each processing element may be implemented with different numbers of cores as desired.

Each processing element 470, 480 may include at least one shared cache 446. The shared cache 446A, 446B may store data (e.g., computing instructions) that are utilized by one or more components of the processing element, such as the cores 474A, 474B and 484A, 484B, respectively. For example, the shared cache may locally cache data stored in a memory 432, 434 for faster access by components of the processing elements 470, 480. For one or more embodiments, the shared cache 446A, 446B may include one or more mid-level caches, such as level 2 (L2), level 3 (L3), level 4 (L4), or other levels of cache, a last level cache (LLC), or combinations thereof. The memory 432, 434 may include software instructions representing a VM locker logic/module 101 and a filter driver 205 that is accessible by each of the processing elements 470 and 480. Each of the VM locker logic/module 101 and the filter driver 205 is described above in connection with at least FIG. 1, 2A, 2B, 2C, 3A, or 3B.

While FIG. 4 illustrates a programmable device with two processing elements 470, 480 for clarity of the drawing, the scope of the present invention is not so limited and any number of processing elements may be present. Alternatively, one or more of processing elements 470, 480 may be an element other than a processor, such as an graphics processing unit (GPU), a digital signal processing (DSP) unit, a field programmable gate array, or any other programmable processing element. Processing element 480 may be heterogeneous or asymmetric to processing element 470. There may be a variety of differences between processing elements 470, 480 in terms of a spectrum of metrics of merit including architectural, microarchitectural, thermal, power consumption characteristics, and the like. These differences may effectively manifest themselves as asymmetry and heterogeneity amongst processing elements 470, 480. In some embodiments, the various processing elements 470, 480 may reside in the same die package.

First processing element 470 may further include memory controller (MC) logic 472 and point-to-point (P-P) interconnects 476 and 478. Similarly, second processing element 480 may include a MC 482 and P-P interconnects 486 and 488. As illustrated in FIG. 4, MC logic 472 and MC logic 482 couple processing elements 470, 480 to respective memories, namely a memory 432 and a memory 434, which may be portions of main memory locally attached to the respective processors. While MC logic 472 and MC logic 482 are illustrated as integrated into processing elements 470, 480, in some embodiments the memory controller logic may be discrete logic outside processing elements 470, 480 rather than integrated therein.

Processing element 470 and processing element 480 may be coupled to an I/O subsystem 490 via respective P-P interconnects 476 and 486 through links 452 and 454. As illustrated in FIG. 4, I/O subsystem 490 includes P-P interconnects 494 and 498. Furthermore, I/O subsystem 490 includes an interface 492 to couple I/O subsystem 490 with a high performance graphics engine 438. In one embodiment, a bus (not shown) may be used to couple graphics engine 438 to I/O subsystem 490. Alternately, a point-to-point interconnect 439 may couple these components. In turn, I/O subsystem 490 may be coupled to a first link 416 via an interface 496. In one embodiment, first link 416 may be a Peripheral Component Interconnect (PCI) bus, or a bus such as a PCI Express bus or another I/O interconnect bus, although the scope of the present invention is not so limited.

As illustrated in FIG. 4, various I/O devices 414, 424 may be coupled to first link 416, along with a bridge 418 that may couple first link 416 to a second link 420. In one embodiment, second link 420 may be a low pin count (LPC) bus. Various devices may be coupled to second link 420 including, for example, a keyboard/mouse 412, communication device(s) 426 (which may in turn be in communication with one or more other programmable devices via one or more networks 405), and a data storage unit 428 such as a disk drive or other mass storage device which may include code 430, for one embodiment. The code 430 may include instructions for performing embodiments of one or more of the techniques described above. Further, an audio I/O 424 may be coupled to second link 420.

Note that other embodiments are contemplated. For example, instead of the point-to-point architecture of FIG. 4, a system may implement a multi-drop bus or another such communication topology. Although links 416 and 420 are illustrated as busses in FIG. 4, any desired type of link may be used. In addition, the elements of FIG. 4 may alternatively be partitioned using more or fewer integrated chips than illustrated in FIG. 4.

Figure 5:
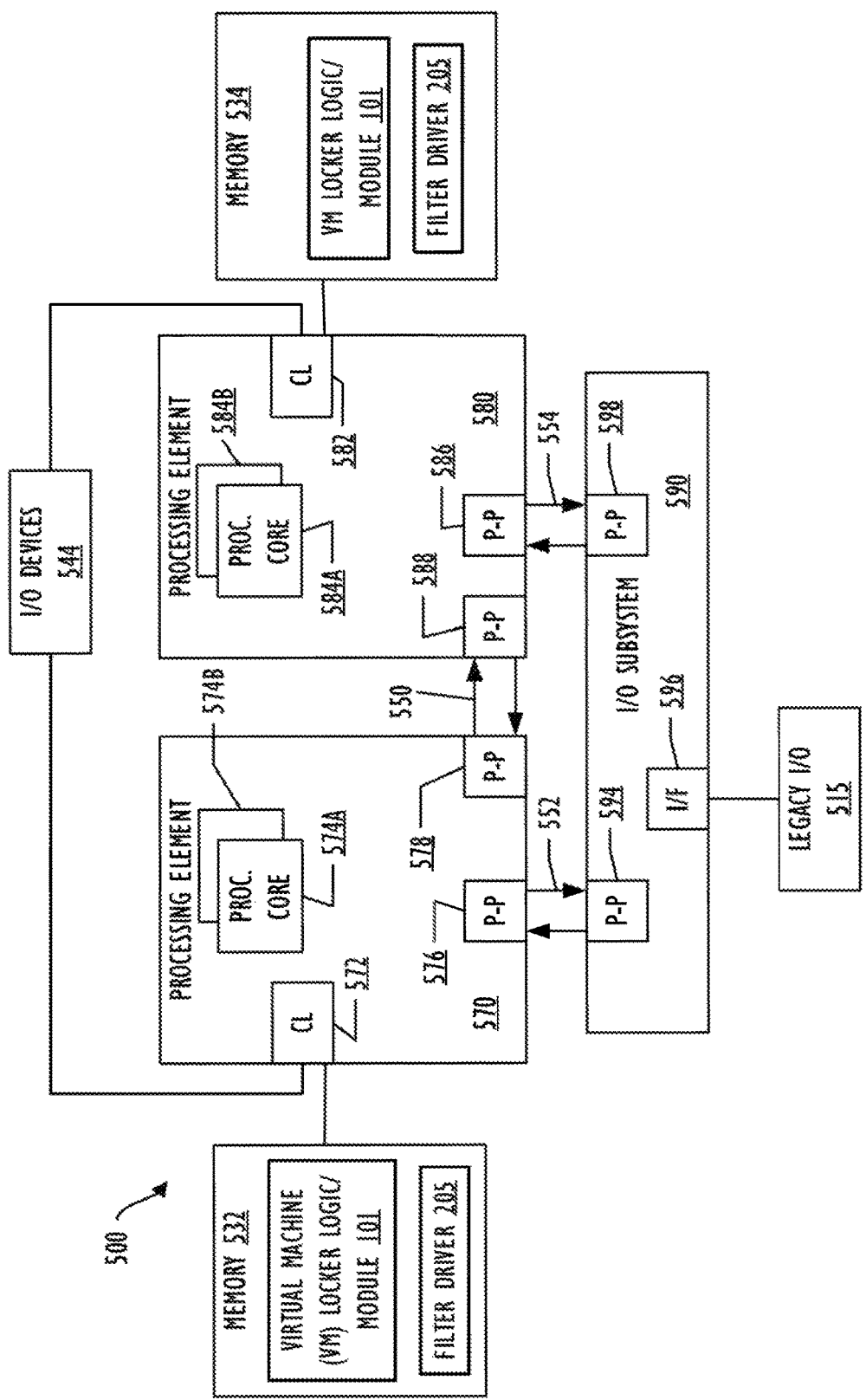
FIG. 5 is a block diagram illustrating a programmable device for use with one or more of the techniques described herein according to another embodiment.

FIG. 5 is a block diagram illustrating a programmable device 500 for use with techniques described herein according to another embodiment. Certain aspects of FIG. 5 have been omitted from FIG. 5 in order to avoid obscuring other aspects of FIG. 5.

FIG. 5 illustrates that processing elements 570, 580 may include integrated memory and I/O control logic ("CL") 572 and 582, respectively. In some embodiments, the CL 572, 582 may include memory control logic (MC) such as that described above in connection with FIG. 4. In addition, CL 572, 582 may also include I/O control logic. FIG. 5 illustrates that not only may the memories 532, 534 be coupled to the CL 572, 582, but also that I/O devices 544 may also be coupled to the control logic 572, 582. Legacy I/O devices 515 may be coupled to the I/O subsystem 590 by interface 596. Each processing element 570, 580 may include multiple processor cores, illustrated in FIG. 5 as processor cores 574A, 574B, 584A, and 584B. As illustrated in FIG. 5, I/O subsystem 590 includes point-to-point (P-P) interconnects 594 and 598 that connect to P-P interconnects 576 and 586 of the processing elements 570 and 580 with links 552 and 554. Processing elements 570 and 580 may also be interconnected by link 550 and interconnects 578 and 588, respectively. The memory 532, 534 may include software instructions representing a VM locker logic/module 101 and a filter driver 205, which are accessible and/or executable by each of the processing elements 570 and 580. Each of the VM locker logic/module 101 and the filter driver 205 is described above in connection with at least FIG. 1, 2A, 2B, 2C, 3A, or 3B.

The programmable devices depicted in FIGS. 4 and 5 are schematic illustrations of embodiments of programmable devices that may be utilized to implement various embodiments discussed herein. Various components of the programmable devices depicted in FIGS. 4 and 5 may be combined in a system-on-a-chip (SoC) architecture.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods or techniques described herein may be provided as a computer program product that may include a machine readable medium having stored thereon instructions that may be used to program a processing system or other device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

The following examples pertain to further embodiments.

Example 1 is a machine readable medium storing instructions for protecting a computer system used in a virtualization environment against fileless malware, comprising instructions that when executed cause the computer system to: receive, by a virtual machine (VM) locker logic/module implemented by one or more processors of the computer system, information comprising input/output (I/O) requests associated with injection of data from an external source into a running instance of a first process associated with a guest operating system (OS) of a VM implemented by the computer system; generate an information log comprising data indicating that the first process includes data from an external source; intercept an execution request by a second process, wherein an execute privilege located in a OS mediated access control mechanism approves the execution request; determine, based on the information log, that the second process is the first process; and remove, by the VM locker and in response to the determination, an execute privilege located in a hypervisor mediated access control mechanism of the VM such that the execution request is denied.

In Example 2, the subject matter of example 1 can optionally include that the injected data includes shellcode.

In Example 3, the subject matter of examples 1 or 2 can optionally include that a filter driver monitors and intercepts the I/O requests.

In Example 4, the subject matter of example 3 can optionally include that the filter driver comprises one or more of a network filter driver and a disk filter driver.

In Example 5, the subject matter of examples 3 or 4 can optionally include that the filter driver monitors the input/output (I/O) requests using one or more hooking techniques.

In Example 6, the subject matter of examples 1, 2, 3, 4, or 5 can optionally include that the hypervisor mediated access control mechanism is based on one or more of an extended page table and rapid virtualization indexing.

In Example 7, the subject matter of examples 1, 2, 3, 4, 5, or 6 can optionally include that the OS mediated access control mechanism is based on one or more of a page table and a translation lookaside buffer.

Example 8 is a method for protecting a computer system used in a virtualization environment against fileless malware, the method comprising: receiving, by a virtual machine (VM) locker logic/module implemented by one or more processors of the computer system, information comprising input/output (I/O) requests associated with injection of data from an external source into a running instance of a first process associated with a guest operating system (OS) of a VM implemented by the computer system; generating an information log comprising data indicating that the first process includes data from an external source; intercepting an execution request by a second process, wherein an execute privilege located in an OS mediated access control mechanism approves the execution request; determining, based on the information log, that the second process is the first process; and removing, by the VM locker and in response to the determination, an execute privilege located in a hypervisor mediated access control mechanism of the VM such that the execution request is denied.

In Example 9, the subject matter of example 8 can optionally include that the injected data includes shellcode.

In Example 10, the subject matter of examples 8 or 9 can optionally include that a filter driver monitors and intercepts the I/O requests.

In Example 11, the subject matter of example 10 can optionally include that the filter driver comprises one or more of a network filter driver and a disk filter driver.

In Example 12, the subject matter of examples 10 or 11 can optionally include that the filter driver monitors the I/O requests using one or more hooking techniques.

In Example 13, the subject matter of examples 8, 9, 10, 11, or 12 can optionally include that the hypervisor mediated access control mechanism is based on one or more of an extended page table and rapid virtualization indexing.

In Example 14, the subject matter of examples 8, 9, 10, 11, 12, or 13 can optionally include that wherein the OS mediated access control mechanism is based on a page table and a translation lookaside buffer.

Example 15 is a computer system used in a virtualization environment and configured to protect itself against fileless malware, the computer system comprising: one or more processors; and a memory storing instructions and coupled to the one or more processors, the stored instructions comprising instructions that when executed cause the one or more processors to: receive, by a virtual machine (VM) locker logic/module implemented by the one or more processors, information comprising input/output (I/O) requests associated with injection of data from an external source into a running instance of a first process associated with a guest operating system (OS) of a VM implemented by the computer system; generate an information log comprising data indicating that the first process includes data from an external source; intercept an execution request by a second process, wherein an execute privilege located in a OS mediated access control mechanism approves the execution request; determine, based on the information log, that the second process is the first process; and remove, by the VM locker and in response to the determination, an execute privilege located in a hypervisor mediated access control mechanism of the VM such that the execution request is denied.

In Example 16, the subject matter of example 15 can optionally include that the injected data includes shellcode.

In Example 17, the subject matter of examples 15 or 16 can optionally include that a filter driver monitors and intercepts the I/O requests.

In Example 18, the subject matter of example 17 can optionally include that the filter driver comprises one or more of a network filter driver and a disk filter driver.

In Example 19, the subject matter of examples 17 or 18 can optionally include that the filter driver monitors the I/O requests using one or more hooking techniques.

In Example 20, the subject matter of examples 15, 16, 17, 18, or 19 can optionally include that the hypervisor mediated access control mechanism is based on one or more of an extended page table and rapid virtualization indexing.

In Example 21, the subject matter of examples 15, 16, 17, 18, 19, or 20 can optionally include that the OS mediated access control mechanism is based on a page table and a translation lookaside buffer.

Other Examples are possible as is evident from the accompanying drawings and description provided above.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

In this document, reference may have been made to one or more common law or registered trademarks of parties affiliated or unaffiliated with the applicant or the assignee. Use of these marks is by way of example and shall not be construed as descriptive or to limit the scope of the embodiments described herein to material associated only with such marks.

What is claimed is:

1. A machine readable storage device or storage disk comprising instructions to protect a computer system used in a virtualization environment against fileless malware, the instructions, when executed, cause the computer system to, at least:

receive, by a virtual machine (VM) locker implemented by one or more processors of the computer system, information including input/output (I/O) requests associated with injection of data from an external source into a running instance of a first process associated with a guest operating system (OS) of a VM implemented by the computer system, the injected data including shellcode, and a filter driver to monitor and intercept the I/O requests;

generate an information log corresponding to the injection of data, the log including (a) an indication that the first process includes the injected data from the external source, (b) an indication of memory regions corresponding to the first process and (c) corresponding sizes of the memory regions associated with the first process;

detect a change of an execute privilege initially set by an OS mediated access controller, the change invoked by a second process to permit the execute privilege;

intercept a kernel-mode execution request by the second process;

compare memory regions and sizes of the kernel-mode execution request by the second process to the memory regions and the corresponding sizes associated with the first process in the information log; and remove, by the VM locker, the execute privilege in response to the kernel-mode execution request and a match of (a) the memory regions and (b) the corresponding sizes associated with the first process, the removal of the execution privilege to cause a denial of the kernel-mode execution request.

2. The machine readable storage device or storage disk of claim 1, wherein the filter driver includes at least one of a network filter driver or a disk filter driver.

3. The machine readable storage device or storage disk of claim 1, wherein the filter driver monitors the input/output (I/O) requests using hooking techniques.

4. The machine readable storage device or storage disk of claim 1, further including a hypervisor mediated access controller based on at least one of an extended page table or rapid virtualization indexing, the hypervisor mediated access controller to store the execute privilege.

5. The machine readable storage device or storage disk of claim 1, wherein the OS mediated access controller is based on at least one of a page table or a translation lookaside buffer.

6. A method for protecting a computer system used in a virtualization environment against fileless malware, the method comprising, at least:

receiving, by a virtual machine (VM) locker implemented by one or more processors of the computer system, information including input/output (I/O) requests associated with injection of data from an external source into a running instance of a first process associated with a guest operating system (OS) of a VM implemented by the computer system, the injected data including shellcode, and a filter driver to monitor and intercept the I/O requests;

generating an information log corresponding to the injection of data, the log including (a) an indication that the first process includes the injected data from the external source, (b) an indication of memory regions corresponding to the first process and (c) corresponding sizes of the memory regions associated with the first process;

detecting a change of an execute privilege initially set by an OS mediated access controller, the change invoked by a second process to permit the execute privilege;

intercepting a kernel-mode execution request by the second process;

comparing memory regions and sizes of the kernel-mode execution request by the second process to the memory regions and the corresponding sizes associated with the first process in the information log; and removing, by the VM locker, the execute privilege in response to the kernel-mode execution request and a match of (a) the memory regions and (b) the corresponding sizes associated with the first process, the removal of the execution privilege to cause a denial of the kernel-mode execution request.

7. The method of claim 6, wherein the filter driver includes at least one of a network filter driver or a disk filter driver.

8. The method of claim 6, wherein the filter driver monitors the I/O requests using hooking techniques.

9. The method of claim 6, wherein the OS mediated access controller is based on a page table and a translation lookaside buffer.

10. A computer system used in a virtualization environment to protect itself against fileless malware, the computer system comprising at least:

one or more processors; and memory storing executable instructions that, when executed, cause the one or more processors to:

receive, by a virtual machine (VM) locker implemented by the one or more processors, information including input/output (I/O) requests associated with injection of data from an external source into a running instance of a first process associated with a guest operating system (OS) of a VM implemented by the computer system, the injected data including shellcode, and a filter driver to monitor and intercept the I/O requests;

generate an information log corresponding to the injection of data, the log including (a) an indication that the first process includes the injected data from the external source;

detect a change of an execute privilege initially set by an OS mediated access controller, the change invoked by a second process to permit the execute privilege;

intercept a kernel-mode execution request by the second process;

compare memory regions and sizes of the kernel-mode execution request by the second process to the memory regions and the corresponding sizes associated with the first process in the information log; and remove, by the VM locker, the execute privilege in response to the kernel-mode execution request and a match of (a) the memory regions and (b) the corresponding sizes associated with the first process, the removal of the execution privilege to cause a denial of the kernel-mode execution request.

11. The computer system of claim 10, wherein the filter driver includes at least one of a network filter driver or a disk filter driver.

12. The computer system of claim 10, wherein the filter driver monitors the I/O requests using hooking techniques.

13. The computer system of claim 10, wherein the OS mediated access controller is based on a page table and a translation lookaside buffer.

* * * * *